H. COONEY.
TIRE VULCANIZING MOLD.
APPLICATION FILED FEB. 16, 1916.

1,225,584.

Patented May 8, 1917.

Witnesses
C. M. Fischer
J. W. Garner

Inventor
Hugh Cooney

By Victor J. Evans
Attorney

United States Patent Office.

HUGH COONEY, OF MARION, INDIANA.

TIRE-VULCANIZING MOLD.

1,225,584.    Specification of Letters Patent.    Patented May 8, 1917.

Application filed February 16, 1916. Serial No. 78,718.

*To all whom it may concern:*

Be it known that I, HUGH COONEY, a citizen of the United States, residing at Marion, in the county of Grant and State of Indiana, have invented new and useful Improvements in Tire-Vulcanizing Molds, of which the following is a specification.

This invention relates to improvements in automobile tires and especially with reference to a vulcanizing mold for such tires, one object of the invention being to provide a protecting layer of rubber or other suitable material which serves to line the tire while the latter is being vulcanized and prevents air or steam from attacking and injuring the fabric of the tire; another object being to effect improvements in the construction of the mold whereby a space is provided therein around the tread of the tire to equalize tension in the tire; another object being to effect improvements in the construction of the mold so that leakage of air or steam therefrom is prevented.

The invention consists in the construction, combination and arrangement of devices hereinafter described and claimed.

In the accompanying drawings:—

Figure 1:
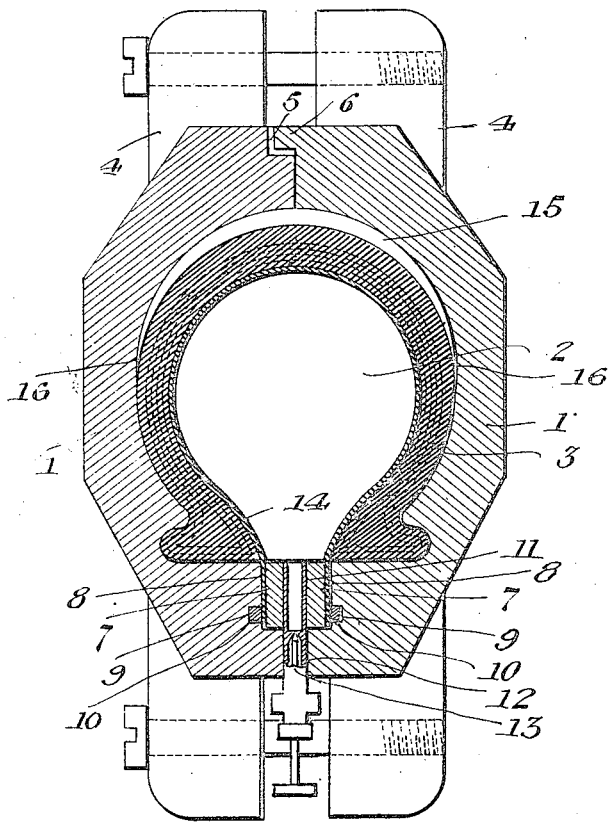
Figure 1 is a transverse sectional view of a vulcanizing mold and tire constructed and arranged in accordance with my invention.
Figure 2:
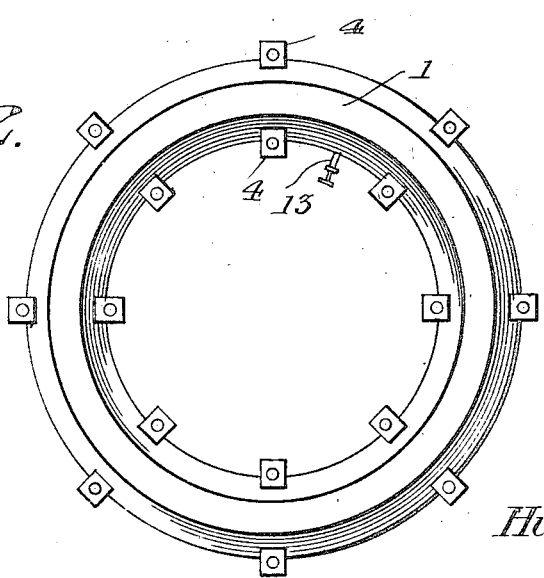
Fig. 2 is an elevation of the mold, on a smaller scale.

The mold comprises a pair of circular members 1 which are formed with an annular mold space 2 in their opposing sides for the reception of a tire 3, for vulcanizing the latter. The mold space may be constructed for the reception of a clencher tire as here shown or for the reception of any other ordinary form of tire as may be desired. The mold members are provided with lugs 4 for the reception of cap screws wherewith to secure the mold members together. At its periphery one of the mold members is provided with a groove 5. The other is formed with a peripheral tongue or shoulder 6 to bear in said groove.

A pair of metal rings 7 are arranged in grooves 8 in the opposing sides of the mold members, near the inner side of the mold and are provided with packings 9 which are arranged in grooves 10, at the outer sides of said rings. An opening 11 is formed in the opposing sides of the rings and the mold members are also formed with an opening 12 in line with and which communicate with said opening 11, a valve 13 for the inlet and outlet of steam or compressed air being arranged in the opening 12 and adapted for the attachment of the steam or air pipes thereto.

A lining 14 of rubber, or other suitable material is arranged on the inner side of the tire and its sides are extended between the rings 7 and the opposing sides of the grooves 8. This lining in coaction with the rings and mold members prevents leakage of air or steam from the interior of the tire and also prevents the air or steam from attacking and injuring the fabric of the tire.

To equalize tension around the tread of the tire the mold chamber is formed with an enlargement 15 which extends around the tread of the tire and the sides of which converge to the sides of the tire as at 16. The mold chamber of the tire may within the scope of my invention be of any suitable size and shape or design, according to the kind of tire to be vulcanized in the mold.

While I have herein shown and described a preferred form of my invention I would have it understood that changes may be made in the form, proportion and construction of the several parts without departing from the spirit of the invention and within the scope of the appended claims.

Having thus described my invention, I claim:—

1. A tire vulcanizing mold comprising a pair of members having a mold chamber in their opposing sides and also provided in their opposing sides with grooves near the inner side of the mold, packing rings in said grooves, counter-grooves in the tire members at the outer side of said packing rings, packing in said counter-grooves, and a protecting lining for arrangement in the tire and with its sides extending beyond the sides of the tire, said extended sides of the lining being engaged between said packing rings and the opposing sides of said grooves and said packings in the counter-grooves.

2. A tire vulcanizing mold comprising a pair of members having a mold chamber in their opposing sides and also provided in their opposing sides with grooves near the inner side of the mold, packing rings in said grooves, a protecting lining for arrangement in the tire and having its sides extending beyond the sides of the tire, said extending sides of the lining being engaged between said packing rings and the opposing sides of said grooves, said mold members and packing rings having alined openings in their opposing sides, and a valve arranged in said openings.

3. A tire vulcanizing mold comprising a pair of members having a mold chamber in their opposing sides and also provided in their opposing sides with grooves near the inner side of the mold, packing rings in said grooves, a protecting lining for arrangement in the tire and having its sides extending beyond the sides of the tire, said extending sides of the lining being engaged between said packing rings and the opposing sides of said grooves, said mold members and packing rings having alined openings in their opposing sides, and a valve arranged in said openings, and a clamping means connecting the pair of mold members detachably together and also clamping the valve in place.

In testimony whereof I affix my signature in presence of two witnesses.

HUGH COONEY.

Witnesses:
ELMER E. MASON,
COURTNEY B. MCDONOUGH.